United States Patent
Nishimura

(10) Patent No.: US 6,767,413 B2
(45) Date of Patent: Jul. 27, 2004

(54) METAL SURFACE TREATING AGENT

(75) Inventor: Satoshi Nishimura, Yokohama (JP)

(73) Assignee: Nippon Paint Co., Ltd., Osaka (JP)

( * ) Notice: Subject to any disclaimer, the term of this patent is extended or adjusted under 35 U.S.C. 154(b) by 138 days.

(21) Appl. No.: 10/096,875

(22) Filed: Mar. 14, 2002

(65) Prior Publication Data

US 2003/0015258 A1 Jan. 23, 2003

(30) Foreign Application Priority Data

Mar. 15, 2001 (JP) .......................................... 2001-074569

(51) Int. Cl.$^7$ ............................................. C23C 22/00
(52) U.S. Cl. ....................... 148/243; 148/247; 148/251; 148/275; 106/14.11; 252/388; 252/393; 252/396
(58) Field of Search ................................. 148/243, 247, 148/251, 275; 106/14.11; 252/388, 393, 396

(56) References Cited

U.S. PATENT DOCUMENTS 5,859,107 A * 1/1999 Jones et al. .................. 524/406

2003/0213533 A1 * 11/2003 Sako et al. .................. 148/243

FOREIGN PATENT DOCUMENTS

GB 1 577 988 A 10/1980

* cited by examiner

*Primary Examiner*—Andrew L. Oltmans
(74) *Attorney, Agent, or Firm*—Sughrue Mion, PLLC

(57) ABSTRACT

The present invention provides a non-chromium metal surface treating agent which has excellent adhesion with a coating and corrosion resistance, and also has excellent workability and stability. A metal surface treating agent comprising a water-soluble zirconium compound, a water-soluble or water-dispersant acrylic resin and a water-soluble or water-dispersant thermosetting crosslinking agent, wherein said water-soluble zirconium compound has a zirconium content of 500 to 15000 ppm on a mass basis, said acrylic resin has an acid value of solid matter of 150 to 740 mgKOH/g, a hydroxyl value of solid matter of 24 to 240 mgKOH/g, and a solid matter content of 500 to 30000 ppm on a mass basis, and said thermosetting crosslinking agent has a solid matter content of 125 to 7500 ppm on a mass basis.

1 Claim, 2 Drawing Sheets

METAL SURFACE TREATING AGENT

BACKGROUND OF THE INVENTION

The present invention relates to a metal surface treating agent and more specifically to a metal surface treating agent for aluminum or aluminum alloy in which adhesion with a coating and corrosion resistance are enhanced.

Prior Art

A cover material of aluminum alloy of a metallic can such as a beverage can and a food can is generally formed by degreasing a metal plate, applying a top coating onto the plate treated for the groundwork, and curing under heating. Here, treatments for the groundwork mean a surface treatment of a metal plate to be done for providing mainly adhesion with the top coating and corrosion resistance to the metal plate.

Though a chromate-phosphate surface treating agent has been used for the surface treatment of the cover material of aluminum alloy of the metallic can, the metal surface treating agent, which is a non-chromium surface treating agent that does not use chromium compound and can provide high adhesion with the top coating and corrosion resistance, is required in recent years on a request from environmental protection and market needs.

As a non-chromium chemical conversion treating agent, there is disclosed a surface treating agent for aluminum which contains zirconium and/or titanium, phosphate and fluoride in Japanese Kokoku Publication Sho-56-33468. However, this technology was insufficient as a coating ground of the cover material of aluminum alloy of the metallic can, in the high adhesion with the coating and the corrosion resistance as a coating material.

In Japanese Kokoku Publication Sho-63-30218, there is disclosed a non-chromium surface treating agent which is composed of water-soluble titanium and/or zirconium compounds, and tannic material and/or water-soluble or water-dispersant organic high polymer material. This technology is a combination of the above-mentioned inorganic compounds, the tannic material, a polymer or a copolymer of acrylic acids and esters thereof and a polymer or a copolymer of methacrylic acids and esters thereof selected as the organic high polymer material, and was insufficient in the corrosion resistance as a coating material required as a coating ground of the cover material of aluminum alloy of the metallic can.

SUMMARY OF THE INVENTION

In view of the problem as mentioned above, it is an object of the present invention to provide a non-chromium metal surface treating agent which has excellent adhesion with a coating and corrosion resistance, and also has excellent workability and stability.

The present invention is a metal surface treating agent comprising a water-soluble zirconium compound, a water-soluble or water-dispersant acrylic resin and a water-soluble or water-dispersant thermosetting crosslinking agent, wherein said water-soluble zirconium compound has a zirconium content of 500 to 15000 ppm on a mass basis, said acrylic resin has an acid value of solid matter of 150 to 740 mgKOH/g, a hydroxyl value of solid matter of 24 to 240 mgKOH/g, and a solid matter content of 500 to 30000 ppm on a mass basis, and said thermosetting crosslinking agent has a solid matter content of 125 to 7500 ppm on a mass basis.

Preferably, the above-mentioned water-soluble or water-dispersant thermosetting crosslinking agent is a condensation product of melamine, formaldehyde and alkyl monoalcohol having 1 to 4 carbon atoms and/or a condensation product of carbolic acid and formaldehyde.

Preferably, the above-mentioned metal surface treating agent treats an aluminum or aluminum alloy so as to provide the water-soluble zirconium compound with zirconium of 0.8 to 35 mg/M$^2$, the water-soluble or water-dispersant acrylic resin with the solid matter of 1 to 60 mg/M$^2$ and the water-soluble or water-dispersant thermosetting crosslinking agent with the solid matter of 0.25 to 15 mg/m$^2$, respectively by mass per one surface after drying.

Preferably, the above mentioned metal surface treating agent treats an aluminum or aluminum alloy.

The present invention is further an aluminum or aluminum alloy, wherein at least one surface thereof is treated with the above-mentioned metal surface treating agent.

Preferably, the above-mentioned aluminum or aluminum alloy is used for a cover material of a beverage can or a food can and further more preferably, it is subjected to a cleaning with acid followed by a treatment with the metal surface treating agent or subjected to a cleaning with alkaline and a cleaning with acid followed by a treatment with the metal surface treating agent.

The present invention is further an aluminum or aluminum alloy wherein a coat is formed on at least one surface thereof, said coat containing the water-soluble zirconium compound with zirconium of 0.8 to 35 mg/m$^2$, the water-soluble or water-dispersant acrylic resin with the solid matter of 1 to 60 mg/m$^2$ and the water-soluble or water-dispersant thermosetting crosslinking agent with the solid matter of 0.25 to 15 mg/M$^2$, respectively by mass per one surface after drying.

EXPLANATION OF THE NUMERICAL SYMBOLS

Figure 1:
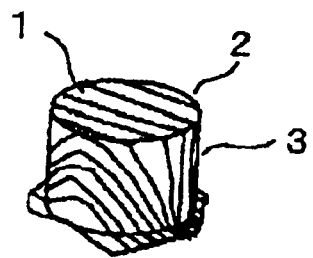
FIG. 1 shows a diagrammatic view of a configuration of a test piece for an evaluation of corrosion resistance.

1 Plane portion
2 Edge portion
3 Side portion
21 Incision
22, 31 Surface not coated
23 Grain of rolling

DESCRIPTION OF THE INVENTION

Hereinafter, the present invention will be described in detail.

A metal surface treating agent of the present invention contains a water-soluble zirconium compound, a water-soluble or water-dispersant acrylic resin and a water-soluble or water-dispersant thermosetting crosslinking agent.

The above-mentioned water-soluble zirconium compound is not limited in particular so long as it is a compound containing zirconium, and for example $H_2ZrF_6$, $(NH_4)_2ZrF_6$, $(NH_4)_2ZrO(CO_3)_2$ and the like can be mentioned, and $H_2ZrF_6$ and $(NH_4)_2ZrO(CO_3)_2$ are preferred.

The above-mentioned water-soluble zirconium compound has a zirconium content of 500 to 15000 ppm on a mass basis in the metal surface treating agent of the present invention. When the content is less than 500 ppm, adhesion with the coating and corrosion resistance deteriorate, and when the content is higher than 15000 ppm, the adhesion with the coating deteriorates and this leads to an increase in cost.

The water-soluble or water-dispersant acrylic resin contained in the metal surface treating agent of the present invention has a hydroxyl value of solid matter of 24 to 240 mgKOH/g. When the hydroxyl value is less than 24, the adhesion with the coating and the corrosion resistance deteriorate, and when it is larger than 240, long-term stability of the obtained acrylic resin deteriorates. Preferably, it is 30 to 200, and more preferably 40 to 140.

The above-mentioned acrylic resin has an acid value of solid matter of 150 to 740 mgKOH/g. When the acid value is less than 150 mgKOH/g, water solubility decreases and this results in degradation in the appearance of a coat, and further the adhesion with the coating deteriorates, and when it is larger than 740 mgKOH/g, the above-mentioned required hydroxyl value cannot be attained. Preferably, it is 200 to 700 mgKOH/g, and more preferably 300 to 650 mgKOH/g.

Preferably, the above-mentioned acrylic resin has a number average molecular weight of 2500 to 50000. When the number average molecular weight is less than 2500, the curability of the resin is not sufficient, and when it is higher than 50000, the viscosity of the obtained metal surface treating agent increases and therefore the workability and the stability in storage deteriorate. More preferably, the number average molecular weight is 6000 to 20000. Further, in this specification, a molecular weight is determined by GPC, styrene polymer equivalent.

The above-mentioned acrylic resin can be obtained by radical polymerization of ethylenic unsaturated monomers.

As the above-mentioned ethylenic unsaturated monomer, it is not particularly restricted, but includes, for example, ethylenic unsaturated monomer containing a hydroxyl group such as 2-hydroxyethyl (meth)acrylate, 2-hydroxypropyl (meth)acrylate, 4-hydroxybutyl (meth)acrylate, allyl alcohol, methacrylalcohol and an adduct of 2-hydroxyethyl (meth) acrylate and ε-caprolactone;

(meth) acrylic acid and derivatives thereof such as acrylic acid, methacrylic acid, crotonic acid, isocrotonic acid, dimer of acrylic acid and ε-caprolactone adduct of acrylic acid; ethylenic unsaturated monomer having a carboxyl group such as maleic acid, fumaric acid, itaconic acid and like unsaturated dibasic acid, and half ester, half amide and half thioester thereof; and ethylenic unsaturated monomer containing an amide group such as (meth)acrylamide, N-methylol (meth) acrylamide, N,N-dimethyl (meth)acrylamide, N,N-dibutyl (meth)acrylamide, N, N-dioctyl (meth) acrylamide, N-monobutyl (meth)acrylamide and N-monooctyl (meth)acrylamide.

As the above-mentioned monomer for the acrylic resin, another monomer such as (meth)acrylic ester monomer such as methyl (meth)acrylate, ethyl (meth)acrylate, n-butyl (meth)acrylate, isobutyl acrylate, t-butyl acrylate, 2-ethylhexyl (meth)acrylate, lauryl methacrylate, phenyl acrylate, isobornyl (meth)acrylate, cyclohexyl methacrylate, t-butylcyclohexyl (meth)acrylate, dicyclopentadienyl (meth) acrylate and dihydrodicyclopentadienyl (meth) acrylate; polymeric aromatic compound such as styrene, α-methylstyrene, vinyl ketone, t-butylstyrene, p-chlorostyrene and vinyl naphthalene;

polymeric nitryl such as acrylonitrile and methacrylonitrile;

α-olefin such as ethylene and propylene;

vinyl ester such as vinyl acetate and vinyl propionate; and dien such as butadiene and isoprene can further be used.

The above-mentioned ethylenic unsaturated monomer and another monomer can be used alone or in a mixture of two kinds or more.

As a polymerization method to obtain the above-mentioned acrylic resin, a general method such as solution radical polymerization which is shown in known literatures can be used. For example, a method of agitating an appropriate solvent at a polymerization temperature of 60 to 160° C. over 2 to 10 hours while dropping an appropriate radical polymerization initiator and a monomer mixed solution into the solvent can be mentioned.

The above-mentioned acrylic resin has a solid matter content of 500 to 30000 ppm on a mass basis in the metal surface treating agent of the present invention. When the content is less than 500 ppm, the adhesion with the coating and the corrosion resistance deteriorate, and when the content is higher than 30000 ppm, viscosity of the obtained metal surface treating agent increases to be difficult in handling and a performance enhancement of the metal surface treating agent which responds to the formulated amount cannot be attained, and therefore the cost is increased.

The metal surface treating agent of the present invention may be one containing another base resin other than the above-mentioned acrylic resin. The above-mentioned another base resin is not limited in particular, and for example a polyester resin, an alkyd resin, an epoxy resin and an urethane resin can be mentioned, and can be used alone or in combination of two kinds or more.

The water-soluble or water-dispersant thermosetting crosslinking agent contained in the metal surface treating agent of the present invention is not limited in particular, and for example a water-soluble melamine resin, a water-soluble phenol resin and the like can be mentioned. As the above-mentioned water-soluble melamine resin, there can be used, for example, "NIKALAC MX-035" (nonvolatile content 70%) and "NIKALAC MX-042" (nonvolatile content 70%) both manufactured by Sanwa Chemical. As the above-mentioned water-soluble melamine resin, a condensation product of melamine, formaldehyde and alkyl monoalcohol having 1 to 4 carbon atoms is preferred.

As the above-mentioned water-soluble phenol resin, there can be used, for example, "SHOWNOL BRL-157" (nonvolatile content 43%) and "SHOWNOL BRL-141B" (nonvolatile content 45%) both manufactured by Showa Highpolymer CO., LTD. and "RESITOP 4012" (nonvolatile content 38%) manufactured by Gunei Chemical Industry Co., Ltd. As the above-mentioned water-soluble phenol resin, a condensation product of carbolic acid and formaldehyde is preferred.

The above-mentioned water-soluble or water-dispersant thermosetting crosslinking agent has a solid matter content of 125 to 7500 ppm on a mass basis in the metal surface treating agent of the present invention. When the content is less than 125 ppm, the adhesion with the coating and the corrosion resistance deteriorate, and when the content is higher than 7500 ppm, an adhesion enhancement with the coating which responds to the formulated amount cannot be attained, and therefore the cost is increased.

One kind or more kinds of the zirconium compound, the acrylic resin and the thermosetting crosslinking agent that are described above, respectively, can be used.

The metal surface treating agent of the present invention may contain further additives such as a stabilizer, an antioxidant, a surface regulator and an antifoaming agent that are used to general metal surface treating agents if necessary.

Since the metal surface treating agent of the present invention uses a water-soluble or water-dispersant substance as the zirconium compound, the acrylic resin and the thermosetting crosslinking agent that are described above, it does not need to contain a solvent and can be prepared as an aqueous solution or an aqueous dispersant. By making the metal surface treating agent a non-solvent type, it is possible to eliminate the solvent released into the atmosphere and to contribute to the environmental protection and the safety of coating works.

The metal surface treating agent of the present invention can be produced by a known method of mixing and agitating, for example, the acrylic resin, the thermosetting crosslinking agent, the zirconium compound that are described above and additives used if necessary.

The thus-obtained metal surface treating agent is used to surface treatment of a material to be treated having a metal surface. As the above-mentioned material to be treated, there is given, for example, a metallic base material, and aluminum or aluminum alloy is preferred, and, for example, an aluminum alloy 5182 material, an aluminum alloy 5021 material and an aluminum alloy 5022 material that are often used for cover materials of beverage cans and food cans are preferably used. An application of the above-mentioned material to be treated is not limited in particular, and for example there are vessels for food and beverage, and the beverage can. Particularly, the cover material of the beverage can is preferable as its application. The metal surface treating agent of the present invention is used suitably for the cover material of aluminum alloy of the beverage can and the food can.

A method of surface treatment of the above-mentioned metallic base material is not limited in particular, and for example a general method of metal surface treatment may be used, and for example a method comprising degreasing, water cleaning/acid cleaning and surface regulating if necessary, and then treating with the metal surface treating agent of the present invention followed by heating to dry the metallic base material may be employed. Further, a top coating film is formed onto thus-obtained surface treated base material if necessary.

The above-mentioned method of surface treatment is used suitably to metallic coils and sheets of cut plate.

The above-mentioned degreasing treatment is not limited in particular, and for example alkaline cleaning which has been adopted in degreasing the metals such as aluminum and aluminum alloy can be performed. In the case of applying the metal surface treating agent of the present invention, it is preferred to use the method of (a) cleaning with acid further after the above-mentioned alkaline cleaning or (b) cleaning with acid without the above-mentioned alkaline cleaning in that the adhesion with the coating and the corrosion resistance is enhanced. In the above-mentioned degreasing treatment, generally, the alkaline cleaning is performed through the use of an alkaline cleaner and the acid cleaning is performed through the use of an acid cleaner.

The above-mentioned alkaline cleaner is not limited in particular, and for example an alkaline cleaner used in a usual alkaline cleaning can be adopted. For example, there is given "SURF CLEANER 322N8" manufactured by Nippon Paint Co., Ltd. The above-mentioned acid cleaner is not limited in particular, and for example an inorganic acid such as a sulfuric acid, a nitric acid and a hydrochloric acid; and "SURF CLEANER ST160" manufactured by Nippon Paint Co., Ltd. can be mentioned.

The above-mentioned degreasing treatment is generally performed through spraying. After the above-mentioned degreasing treatment is performed, water cleaning is performed to remove a degreasing agent remaining on the surface of the base material and then a water on the surface of the base material is removed by the way of draining with a roller, blowing air or drying with hot air.

With respect to an amount of the coat obtained by treating with the ground treatment agent of the present invention, it is preferred, for example, that the coat contains the water-soluble zirconium compound with zirconium of 0.8 to 35 mg/M$^2$, the water-soluble or water-dispersant acrylic resin with the solid matter of 1 to 60 mg/m$^2$ and the water-soluble or water-dispersant thermosetting crosslinking agent with the solid matter of 0.25 to 15 mg/m$^2$, respectively by mass per one surface after drying.

Treatment with the ground treatment agent of the present invention may be performed in such a way that the formed coat weight is within the above-mentioned range, and treatment method with the above-mentioned ground treatment agent is not limited in particular, and for example roller coating, dip coating and spraying can be used. Preferably, roller coating is used.

Treatment with the ground treatment agent of the present invention varies with an application of the material to be treated but it maybe applied to at least one surface of the above-mentioned thin plate and also applied to both surfaces of the above-mentioned thin plate.

Drying method of the coat obtained by the above-mentioned ground treatment agent is performed by heat drying, and for example oven drying and/or heat drying through a forced circulation of hot air may be mentioned, and these heat drying are generally performed at a temperature of 60 to 180° C. for 6 to 60 seconds.

A top coating film to be formed if necessary onto the base material on which surface treatment is performed as mentioned above is not limited in particular, and for example a clear coating film which does not contain a pigment may be mentioned. The above-mentioned clear coating film is applied to protect the base material including the coat obtained by surface treatment and enhance the appearance thereof, and generally is formed by applying a clear coating and curing the resulting coating film under heating. The above-mentioned clear coating and a method of coating and curing under heating are not limited in particular, and a conventionally known method, for example, may be used.

Since the metal surface treating agent of the present invention contains the zirconium compound, the acrylic resin and the thermosetting crosslinking agent that are described above each in a specific amount, it has the excellent workability and stability, and the resulting coat has not only the sufficient adhesion with a top coating but also the corrosion resistance. Therefore, the metal surface treating agent of the present invention is used suitably for the surface treatment of the metallic base material, particularly aluminum or aluminum alloy. As the above-mentioned metallic base material, a metallic base material which is used for cover materials of vessels for food and beverage, preferably a beverage can and a food can, is preferably used.

Since the metal surface treating agent of the present invention is formed by the above-mentioned composition, it is the non-chromium metal surface treating agent which provides the resulting coat with the corrosion resistance and the sufficient adhesion with the top coating, and has the excellent workability and stability.

EXAMPLES

Hereinafter, the present invention will be described in more detail showing production examples and examples, but the present invention is not limited to these examples. By the way, the term part represents part by weight and percent (%) represents weight percent (%).

Synthesis Example 1 Synthesis of the Acrylic Resin A

A four necked vessel equipped with a heating apparatus and an agitation apparatus was charged with 775 parts of ion-exchanged water and content liquid was heated to 80° C. while agitating and refluxing with nitrogen. Then, a mixed monomer solution of 120 parts of acrylic acid, 20 parts of ethyl acrylate and 60 parts of 2-hydroxyethyl methacrylate, and a mixed solution of 1.6 parts of ammonium peroxodisulfate and 23.4 parts of ion-exchanged water were respectively dropped to the vessel over 3 hours using a dropping funnel while heating, agitating and refluxing with nitrogen. After end of dropping, operations of heating, agitating and refluxing with nitrogen were continued for 2 hours. Heating and refluxing with nitrogen were stopped, and the solution was cooled to 30° C. under agitation and filtered with a 200-mesh sieve to obtain a colorless clear aqueous solution of a water-soluble acrylic resin A.

In the aqueous solution of acrylic resin A obtained, a nonvolatile content was 20%, an acid value of resin solid matter was 467 and a hydroxyl value of resin solid matter was 129, and a number average molecular weight was 9200.

Synthesis Example 2 Synthesis of the Acrylic Resin B

A colorless clear aqueous solution of acrylic resin B was obtained by the same procedure used in the Synthesis Example 1 except that a composition of monomers of the acrylic resin was taken as 160 parts of acrylic acid, 20 parts of ethyl acrylate and 20 parts of 2-hydroxyethyl methacrylate.

In the aqueous solution of acrylic resin B obtained, a nonvolatile content was 20%, an acid value of resin solid matter was 623 and a hydroxyl value of resin solid matter was 43, and a number average molecular weight was 8400.

Synthesis Example 3 Synthesis of the Acrylic Resin C

A colorless clear aqueous solution of acrylic resin C was obtained by the same procedure used in the Synthesis Example 1 except that a composition of monomers of the acrylic resin was taken as 150 parts of acrylic acid, 40 parts of ethyl acrylate and 10 parts of 2-hydroxyethyl methacrylate.

In the aqueous solution of acrylic resin C obtained, a nonvolatile content was 20%, an acid value of resin solid matter was 584 and a hydroxyl value of resin solid matter was 22, and a number average molecular weight was 8700.

Synthesis Example 4 Synthesis of the Acrylic Resin D

An acrylic resin was synthesized by the same procedure used in the Synthesis Example 1 except that a composition of monomers of the acrylic resin was taken as 30 parts of acrylic acid, 70 parts of ethyl acrylate and 100 parts of 2-hydroxyethyl methacrylate.

Since the solution became white at about 60° C. during a synthesized resin was cooled in the vessel, 28.3 parts of 25% ammonia solution was added as a neutralizer under agitation. This mixture was cooled to 30° C. and a rufous aqueous solution of acrylic resin D was obtained. In the aqueous solution of acrylic resin D obtained, a nonvolatile content was 19.4%, an acid value of resin solid matter was 117 and a hydroxyl value of resin solid matter was 216, and a number average molecular weight was 11600.

Examples 1 to 26, Comparative Examples 1 to 10 (Preparation of the Metal Surface Treating Agent)

A vessel equipped with an agitation apparatus was charged with ion-exchanged water, and the aqueous solution of acrylic resin obtained in the Synthesis Example was added gradually to the vessel while agitating at room temperature and a thermosetting crosslinking agent was added gradually under agitation. Under agitation, a zirconium compound was added gradually and the agitation was continued for 20 minutes to obtain a non-solvent metal surface treating agent. Kinds and formulated amounts (ppm relative to the metal surface treating agent) of solid matter on a mass basis of the aqueous solution of acrylic resins and the thermosetting crosslinking agents that were used, and kinds and formulated amounts (ppm relative to the metal surface treating agent) of zirconium on a mass basis of the zirconium compounds are shown in Tables 1 and 2. As for the thermosetting crosslinking agent, there were used "SHOWNOL BRL-157" (nonvolatile content 43%) manufactured by Showa Highpolymer CO., LTD. as a water-soluble phenol resin and "NIKALAC MX-035" (nonvolatile content 70%) manufactured by Sanwa Chemical as a water-soluble melamine resin. As the zirconium compound, there was used zirconium fluoride hydracid (zirconium content is 17.58%) manufactured by Nippon Light Metal CO., LTD. or $(NH_4)_2ZrO(CO_3)_2$ (trademark is ZIRCOSOLAC-7, zirconium content is 13%) manufactured by Daiichi Kigenso Kagakukogyo CO., LTD.

(Preparation of the Surface Treated Plate)

An aluminum alloy 5182 material was degreased (treated at 65° C. for 3 sec.) by the use of a 2% dilute solution of "SURF CLEANER 322N8" manufactured by Nippon Paint Co., Ltd., and then was cleaned by the use of a 1% dilute solution of sulfuric acid (treated at 50° C. for 3 sec.) and dried to obtain a degreased aluminum alloy plate I.

Aside from this, the aluminum alloy 5182 material was degreased (treated at 65° C. for 3 sec.) by the use of the 2% dilute solution of "SURF CLEANER 322N8" manufactured by Nippon Paint Co., Ltd. and dried to obtain a degreased aluminum alloy plate II.

In addition, the aluminum alloy 5182 material was degreased (treated at 80° C. for 10 sec.) by the use of "SURF CLEANER ST160" manufactured by Nippon Paint Co., Ltd. to obtain a degreased aluminum alloy plate III.

The resulting metal surface treating agent was applied to the degreased plates I, II and III shown in Tables 1 and 2 by the use of a reverse roll coater so as to form a layer of 10 g/m² of wet weight antecedent to drying per surface and this coated plate was dried at a material temperature of 80° C. using a conveyer type oven to obtain a surface treated plate.

As for the coat weight (mg/m$^2$) after drying, the weight of total solid matter of the acrylic resin and the thermosetting crosslinking agent is shown as an organic content and the weight of zirconium in the zirconium compound is shown as Zr respectively in Tables 1 and 2.

(Preparation of the Material Coated with a Coating)

An epoxy water-soluble clear coating "CAN LINER 100" (nonvolatile content 28%) manufactured by Nippon Paint Co., Ltd. is applied to the resulting surface treated plate by the use of a reverse roll coater so as to form a layer of 25 g/m$^2$ of wet weight per surface and this coated plate was dried at a material temperature of 260° C. using a conveyer type oven to obtain a material coated with a coating.

(Evaluation Method)

The following evaluation was carried out and the results are given in Tables 1 to 4.

1. Stability of the Metal Surface Treating Agent

The metal surface treating agents prepared by the above-mentioned way were stored at 40° C. for 30 days, and the appearances of the treatment liquid were visually evaluated. In Tables 1 and 2, to the sample which did not cause abnormal conditions such as occurrences of a white liquid, a precipitation and a coagulating substance and had a better appearance, there was put an expression by a symbol "O", and to the sample which causes abnormal conditions, there was put a description of the content of abnormal conditions.

2. Appearance of the Coat

The surfaces of the surface treated plates obtained by the above-mentioned way were visually evaluated. In Tables 1 and 2, to the sample which did not cause abnormal conditions such as occurrences of cissing crawling, a dent, a boil and a particle matter contamination and had a better appearance, there was put an expression by a symbol "O", and to the sample which causes abnormal conditions, there was put a description of the content of abnormal conditions.

3. Appearance of the Coating Film

The resulting material coated with a coating is referred to as an untreated coating film, and one obtained by keeping the above-mentioned material coated with a coating in the steam of 125° C. for 30 minutes is referred to as a coating film after retorting, and appearances of respective coating films are visually evaluated. In Tables 3 and 4, to the sample which did not cause spot whitening, there was put an expression by a symbol "O", and to the sample which causes spot whitening, there was put a description of spot whitening.

4. Adhesion with the Coating

Respective coated surfaces of the two same materials coated with a coating were mutually bonded by using a hot-melt polyamide film "DIAMIDE FILM #7000" manufactured by Daicel Chemical INDUSTRIES, LTD. and by fixing two materials to each other by applying pressure at 200° C. and at a pressure of 7 kg/cm$^2$ for 1 minute with a hot press tester. The resulting bonded plate was cut out in width of 5 mm, and peeled at a speed of 200 mm/min with a tensilon tester and a force applied then was measured (unit: kgf/5 mm).

5. Corrosion Resistance

The material coated with a coating, which had been processed into a cup by being formed in such a way that the coated surface became convex to present the configuration illustrated in FIG. 1, was immersed in the mixed aqueous solution of 2% citric acid solution and 2% salt solution, which was kept at 50° C., for 72 hours, and after taking it out, a state of corrosion of the respective portions of a side portion 3, a edge portion 2 and a plane portion 1 was rated on a scale of 5 points according the following criterias and the average point was determined.

5 points: There was no corrosion.

4 points: There was little corrosion (side portion: corrosion areas of a diameter less than 0.5 mm were 10 or less, edge portion: corrosion areas of a diameter less than 0.5 mm were 5 or less, plane portion: corrosion areas of a diameter less than 0.5 mm were 5 or less. However, this case excludes the case of 5 points.)

3 points: There was a little corrosion (side portion: corrosion areas of a diameter larger than 0.5 mm and less than 1 mm were 20 or less, edge portion: corrosion areas of a diameter larger than 0.5 mm and less than 1 mm were 10 or less, plane portion: corrosion areas of a diameter larger than 0.5 mm and less than 1 mm were 5 or less.)

2 points: There was corrosion to a large extent (side portion: corrosion areas of a diameter larger than 1 mm and less than 3 mm were 20 or less, edge portion: corrosion areas of a diameter larger than 1 mm and less than 3 mm were 10 or less, plane portion: corrosion areas of a diameter larger than 1 mm and less than 3 mm were 10 or less.)

1 points: There was corrosion wholly. (More than halves of the respective areas of the side portion, the edge portion and the plane portion were corroded. However, this case excludes the case of 2 to 5 points.)

6. Feathering Characteristic

Figure 2:
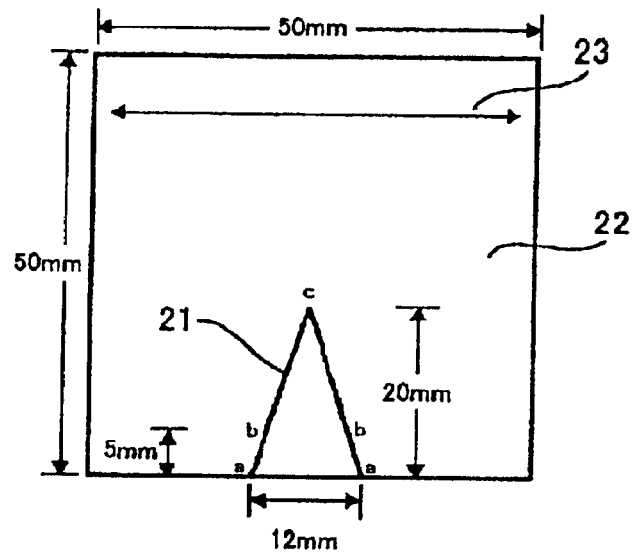
FIG. 2 shows a schematic view of the uncoated surface of a coated material with a coating which is provided with a incision for an evaluation of a feathering characteristic.
Figure 3:
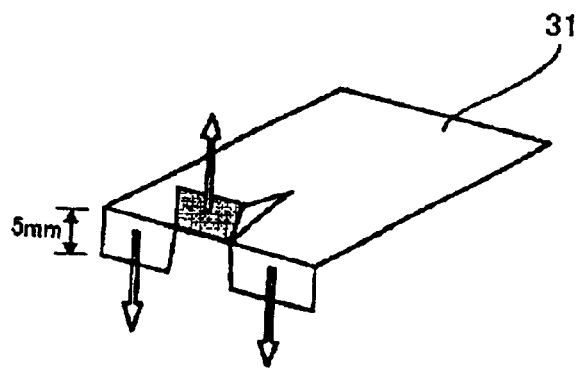
FIG. 3 shows a diagrammatic view of a direction of tension by a tensilon tester.
Figure 4:
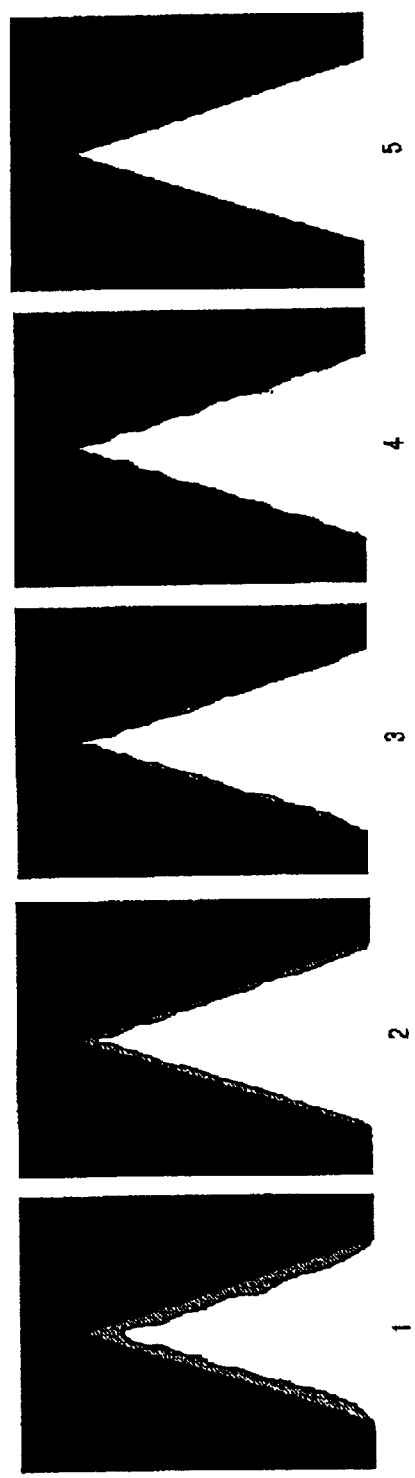
FIG. 4 shows an enlarged view of the incision portion showing five-step visual evaluation criteria in the evaluation of a feathering characteristic.

As shown in FIG. 2, among the material coated with a coating with the size of 50 mm×50 mm, the back side of the coated surface (surface not coated) 22 was scored in a V-shaped incision 21 along the line b-c-b using a NT cutter, and the skirt portion of the V-shaped incision 21 was cut with snips along the line a-b up to the point of 5 mm from a side edge of the material coated with a coating. Then, the skirt portion of the V-shaped incision portion, and both side-end portion thereof were pulled in the reverse direction at a speed of 50 mm/min. with the tensilon tester as shown in FIG. 3 and a state of the coating film remaining of a section was rated on a scale of 5 points according the five-step-visual evaluation criterias shown in FIG. 4.

7. Hardness

A pencil test was performed on the obtained coating film of the material coated with a coating according to JIS K 5400.8.4.2.

Comparative Example 11

The metal surface treating agent was prepared and the plate coated with a coating was prepared and evaluated by the same way used in the Example 1 except that a polyacrylic acid (the acid value of resin solid matter of 780 mgKOH/g, the hydroxyl value of resin solid matter of 0 mgKOH/g, Nippon Junyaku Co., Ltd "Julimer AC-lOH") was used instead of the acrylic resin and that the thermosetting crosslinking agent was not used.

Comparative Example 12

The plate coated with a coating was prepared and evaluated by the same way used in the Example 1 except that chromate-phosphate treating was performed in such a way that the weight per surface area of Cr in the coat weight after drying becomes 20 mg/m$^2$ using "ALSURF 401/45" manufactured by Nippon Paint Co., Ltd. instead of the non-chromium surface treating agent to prepare the surface treated plate.

TABLE 1

| | Degreased aluminum plate | Ground treatment agent compositions ||||| Stability of metal surface treatment reagent | Appearance of coat | Coat weight after drying (mg/m²) ||
| | | Water-soluble acrylic resin |||| Water-soluble curing agent || Zirconium compound || | | | |
| | | Kinds | Acid value | Hydroxyl value | Formulated amount | Kinds | Formulated amount | Kinds | Formulated amount | | | Organic content | Zr |
|---|---|---|---|---|---|---|---|---|---|---|---|---|---|
| Ex. | | | | | | | | | | | | | |
| 1 | I | A | 467 | 129 | 500 | phenol | 500 | H₂ZrF₆ | 5000 | ○ | ○ | 2 | 10 |
| 2 | I | " | " | " | 5000 | " | " | " | " | ○ | ○ | 11 | " |
| 3 | II | " | " | " | " | " | " | " | " | ○ | ○ | 11 | " |
| 4 | III | " | " | " | " | " | " | " | " | ○ | ○ | 11 | " |
| 5 | I | " | " | " | 10000 | " | " | " | " | ○ | ○ | 21 | " |
| 6 | I | " | " | " | 30000 | " | " | " | " | ○ | ○ | 61 | " |
| 7 | I | B | 623 | 43 | 500 | " | " | " | " | ○ | ○ | 2 | " |
| 8 | I | " | " | " | 5000 | " | " | " | " | ○ | ○ | 11 | " |
| 9 | II | " | " | " | " | " | " | " | " | ○ | ○ | 11 | " |
| 10 | III | " | " | " | " | " | " | " | " | ○ | ○ | 11 | " |
| 11 | I | " | " | " | 30000 | " | " | " | " | ○ | ○ | 61 | " |
| 12 | I | A | 467 | 129 | 5000 | " | 125 | " | " | ○ | ○ | 10 | " |
| 13 | I | " | " | " | " | " | 2000 | " | " | ○ | ○ | 14 | " |
| 14 | I | " | " | " | " | " | 7500 | " | " | ○ | ○ | 25 | " |
| 15 | I | " | " | " | " | melamine | 125 | " | " | ○ | ○ | 10 | " |
| 16 | I | " | " | " | " | " | 2000 | " | " | ○ | ○ | 14 | " |
| 17 | I | " | " | " | " | " | 7500 | " | " | ○ | ○ | 25 | " |
| 18 | I | " | " | " | " | phenol/melamine | 80/80 | " | " | ○ | ○ | 10 | " |
| 19 | I | " | " | " | " | " | 1000/1000 | " | " | ○ | ○ | 14 | " |
| 20 | I | " | " | " | " | phenol | 500 | " | 500 | ○ | ○ | 11 | 1 |
| 21 | I | " | " | " | " | " | " | " | 2500 | ○ | ○ | 11 | 5 |
| 22 | I | " | " | " | " | " | " | " | 10000 | ○ | ○ | 11 | 20 |
| 23 | II | " | " | " | " | " | " | " | " | ○ | ○ | 11 | " |
| 24 | III | " | " | " | " | " | " | " | " | ○ | ○ | 11 | " |
| 25 | I | " | " | " | " | " | " | " | 15000 | ○ | ○ | 11 | 30 |
| 26 | I | " | " | " | " | " | " | carbonate | 5000 | ○ | ○ | 11 | 10 | unit of formulated amount: ppm

TABLE 2

| | Degreased aluminum plate | Ground treatment agent compositions ||||| Stability of metal surface treatment reagent | Appearance of coat | Coat weight after drying (mg/m²) ||
| | | Water-soluble acrylic resin |||| Water-soluble curing agent || Zirconium compound || | | | |
| | | Kinds | Acid value | Hydroxyl value | Formulated amount | Kinds | Formulated amount | Kinds | Formulated amount | | | Organic content | Zr |
|---|---|---|---|---|---|---|---|---|---|---|---|---|---|
| Compar. Ex. | | | | | | | | | | | | | |
| 1 | I | none | — | — | 0 | phenol | 1000 | H₂ZrF₆ | 5000 | white | cissing crawling | 2 | 10 |
| 2 | I | A | 467 | 129 | 250 | " | " | " | " | ○ | ○ | 2.5 | " |
| 3 | I | B | 623 | 43 | 250 | " | " | " | " | ○ | ○ | 2.5 | " |
| 4 | I | C | 584 | 22 | 5000 | " | " | " | " | ○ | ○ | 12 | " |
| 5 | I | D | 117 | 216 | " | " | " | " | " | white/precipitation | cissing crawling | 12 | " |
| 6 | I | A | 467 | 129 | " | none | 0 | " | " | ○ | ○ | 10 | " |
| 7 | I | " | " | " | " | phenol | 75 | " | " | ○ | ○ | 10.2 | " |
| 8 | I | " | " | " | " | melamine | 75 | " | " | ○ | ○ | 10.2 | " |
| 9 | I | " | " | " | " | phenol | 1000 | none | 0 | ○ | cissing crawling | 12 | 0 |
| 10 | I | " | " | " | " | phenol | 1000 | H₂ZrF₆ | 250 | ○ | ○ | 12 | 0.5 |
| 11 | I | polyacrylic acid | 780 | 0 | " | none | 0 | " | 5000 | ○ | ○ | 10 | 10 |
| 12 | I | | | | | chromate-phosphate | | | | | | | Cr: 20 | unit of formulated amount: ppm

TABLE 3

Evaluation of material coated with coating

| Ex. | Appearance of coating film Untreated | Appearance of coating film After retrting | Adhesion (kgf/5 mm) | Corrosion resistance | Feathering characteristic | Hardness |
|---|---|---|---|---|---|---|
| 1 | ○ | ○ | 1.9 | 3.7 | 4 | 4H |
| 2 | ○ | ○ | 2.2 | 4.3 | 4 | 4H |
| 3 | ○ | ○ | 1.3 | 3.7 | 3 | 4H |
| 4 | ○ | ○ | 2.4 | 4.7 | 4 | 4H |
| 5 | ○ | ○ | 1.9 | 4.7 | 4 | 4H |
| 6 | ○ | ○ | 1.8 | 4.7 | 4 | 4H |
| 7 | ○ | ○ | 1.7 | 4.0 | 4 | 4H |
| 8 | ○ | ○ | 2.1 | 4.3 | 4 | 4H |
| 9 | ○ | ○ | 1.5 | 3.7 | 3 | 4H |
| 10 | ○ | ○ | 2.0 | 4.3 | 4 | 4H |
| 11 | ○ | ○ | 1.7 | 4.0 | 4 | 4H |
| 12 | ○ | ○ | 1.7 | 3.7 | 4 | 4H |
| 13 | ○ | ○ | 2.2 | 4.7 | 5 | 4H |
| 14 | ○ | ○ | 2.4 | 4.7 | 5 | 4H |
| 15 | ○ | ○ | 2.1 | 3.7 | 4 | 4H |
| 16 | ○ | ○ | 2.1 | 4.3 | 4 | 4H |
| 17 | ○ | ○ | 2.0 | 4.3 | 4 | 4H |
| 18 | ○ | ○ | 2.0 | 3.7 | 4 | 4H |
| 19 | ○ | ○ | 2.4 | 4.7 | 4 | 4H |
| 20 | ○ | ○ | 1.3 | 3.7 | 4 | 4H |
| 21 | ○ | ○ | 1.8 | 4.0 | 4 | 4H |
| 22 | ○ | ○ | 1.6 | 4.3 | 4 | 4H |
| 23 | ○ | ○ | 1.2 | 3.7 | 3 | 4H |
| 24 | ○ | ○ | 1.6 | 4.3 | 3 | 4H |
| 25 | ○ | ○ | 1.3 | 4.3 | 3 | 4H |
| 26 | ○ | ○ | 1.8 | 4.3 | 3 | 4H |

TABLE 4

Evaluation of material coated with coating

| Compar. Ex. | Appearance of coating film Untreated | Appearance of coating film After retrting | Adhesion (kgf/5 mm) | Corrosion resistance | Feathering characteristic | Hardness |
|---|---|---|---|---|---|---|
| 1 | ○ | spot whitening | 0.8 | 1.0 | 2 | 2H |
| 2 | ○ | ○ | 1.0 | 3.0 | 2 | 4H |
| 3 | ○ | ○ | 0.8 | 3.0 | 2 | 4H |
| 4 | ○ | ○ | 1.8 | 3.3 | 3 | 4H |
| 5 | ○ | spot whitening | 1.6 | 2.3 | 3 | 3H |
| 6 | ○ | ○ | 1.5 | 3.3 | 3 | 4H |
| 7 | ○ | ○ | 1.6 | 3.3 | 3 | 4H |
| 8 | ○ | ○ | 1.4 | 3.3 | 3 | 4H |
| 9 | ○ | spot whitening | 0.2 | 1.0 | 1 | 3H |
| 10 | ○ | ○ | 0.5 | 1.7 | 2 | 4H |
| 11 | ○ | ○ | 1.7 | 3.3 | 3 | 4H |
| 12 | ○ | ○ | 1.1 | 3.7 | 3 | 4H |

It was found from Table 1 to 4 that the Comparative Examples 1 to 3 and 6 to 10 which used the acrylic resin, the thermosetting crosslinking agent and the zirconium compound in the formulated amount out of the scope of the present invention, the Comparative Examples 4 and 5 which used the acrylic resin in which the acid value and the hydroxyl value were not within the scope of the present invention, and Comparative Example 11 which used the polyacrylic acid instead of the acrylic resin were inferior to Comparative Example 12 in which chromate-phosphate treating was performed in at least any one of evaluation parameters. On the other hand, it was found that the Examples which used the acrylic resin in which the acid value and the hydroxyl value were within the scope of the present invention, the thermosetting crosslinking agent and the zirconium compound, respectively, in the formulated amount within the scope of the present invention were superior or equivalent to the case of chromate-phosphate treating in any evaluation parameter.

It was found by comparing the Examples 2 to 4, the Examples 8 to 10 and Examples 22 to 24 from table 1 to 4 that Examples 3, 9 and 23 in which only alkaline cleaning was performed as degreasing treatment were sometimes low in the adhesion with the coating, the corrosion resistance and/or the feathering characteristic, and on the contrary Examples 2, 8 and 22 in which acid cleaning was performed after the alkaline cleaning as degreasing treatment and Examples 4, 10 and 24 in which only acid cleaning was performed as degreasing treatment were excellent in any evaluation parameter.

What is claimed is:

1. A metal surface treating agent comprising a water-soluble zirconium compound, a water-soluble or water-dispersant acrylic resin and a water-soluble or water-dispersant thermosetting crosslinking agent, wherein said water-soluble zirconium compound has a zirconium content of 500 to 15000 ppm on a mass basis, said acrylic resin has an acid value of solid matter of 150 to 740 mgKOH/g, a hydroxyl value of solid matter of 24 to 240 mgKOH/g, and a solid matter content of 500 to 30000 ppm on a mass basis, said thermosetting crosslinking agent has a solid matter content of 125 to 7500 ppm on a mass basis, and said water-soluble or water-dispersant thermosetting crosslinking agent is a condensation product of melamine, formaldehyde and alkyl monoalcohol having 1 to 4 carbon atoms and/or a condensation product of carbolic acid and formaldehyde.

* * * * *